United States Patent
Yokozeki

(10) Patent No.: US 10,904,443 B2
(45) Date of Patent: Jan. 26, 2021

(54) LENS APPARATUS AND IMAGE PICKUP APPARATUS THAT CONTROLS DRIVING OF AN OPTICAL MEMBER THEREIN BASED ON COMMAND SOURCE

(71) Applicant: CANON KABUSHIKI KAISHA, Tokyo (JP)

(72) Inventor: Chinami Yokozeki, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/164,023

(22) Filed: Oct. 18, 2018

(65) Prior Publication Data

US 2019/0124270 A1   Apr. 25, 2019

(30) Foreign Application Priority Data

Oct. 23, 2017   (JP) ................... 2017-204261

(51) Int. Cl.
| | | |
|---|---|---|
| *H04N 5/225* | (2006.01) | |
| *G06F 3/0484* | (2013.01) | |
| *H04N 5/232* | (2006.01) | |

(52) U.S. Cl.
CPC ....... *H04N 5/23296* (2013.01); *G06F 3/0484* (2013.01); *H04N 5/2253* (2013.01); *H04N 5/2254* (2013.01)

(58) Field of Classification Search
CPC ............. H04N 5/23296; H04N 5/2254; H04N 5/2253; G06F 3/0484
See application file for complete search history.

(56) References Cited

U.S. PATENT DOCUMENTS

| | | | | |
|---|---|---|---|---|
| 3,766,841 A | * | 10/1973 | Finnegan | G03B 17/12 396/241 |
| 4,839,680 A | * | 6/1989 | Amada | G03B 9/22 396/451 |
| 5,057,927 A | * | 10/1991 | Hieda | G03B 7/085 348/360 |
| 5,311,322 A | * | 5/1994 | Okino | H04N 9/735 348/223.1 |
| 5,825,417 A | * | 10/1998 | Yoshida | H04N 5/2352 348/364 |
| 6,980,251 B1 | * | 12/2005 | Tamura | H04N 5/2351 348/224.1 |
| 2010/0033587 A1 | * | 2/2010 | Yumiki | G02B 7/102 348/220.1 |

(Continued)

FOREIGN PATENT DOCUMENTS

JP   2003279832 A   10/2003

*Primary Examiner* — Hung H Lam
(74) *Attorney, Agent, or Firm* — Rossi, Kimms & McDowell LLP

(57) ABSTRACT

Provided is a lens apparatus including: an optical member; an input device configured to perform input for selecting an operation device for operating a state of the optical member; and a controller configured to perform, in a case where a command is input from the selected operation device, a first control of the state of the optical member based on the input command; and perform, in a case where a command is not input from the selected operation device, a second control of the state of the optical member based on a state of the optical member at a time when the input for selecting the operation device is performed.

12 Claims, 7 Drawing Sheets

(56) References Cited

U.S. PATENT DOCUMENTS

| | | | | |
|---|---|---|---|---|
| 2010/0238321 A1* | 9/2010 | Honjo | ............... | G02B 7/102 |
| | | | | 348/231.99 |
| 2012/0327274 A1* | 12/2012 | Taguchi | ............ | H04N 5/232 |
| | | | | 348/240.2 |
| 2014/0368676 A1* | 12/2014 | Yoshimuta | ............ | H02P 8/22 |
| | | | | 348/207.99 |

* cited by examiner

LENS APPARATUS AND IMAGE PICKUP APPARATUS THAT CONTROLS DRIVING OF AN OPTICAL MEMBER THEREIN BASED ON COMMAND SOURCE

BACKGROUND OF THE INVENTION

Field of the Invention

The present invention relates to a lens apparatus and an image pickup apparatus.

Description of the Related Art

A lens apparatus allows selection to be performed between an automatic operation and a manual operation through selection (switching) between a camera apparatus being an operation device (operation source) for performing an automatic operation and the lens apparatus being an operation device for performing a manual operation.

In a case of moving image photographing, the operation device can be selected for each shot. It is preferred to seamlessly select between the automatic operation and the manual operation in the middle of one shot.

In Japanese Patent Application Laid-Open No. 2003-279832, a target position for manual focus (MF) to be used when switching is performed from automatic focus (AF) to MF is set by being displaced from the previous target position by a change amount of an operation amount of the operation member. With this setting, the focus lens can be moved (i.e., the focus can be adjusted) by MF from the position of the focus lens adjusted by AF.

Further, as the switching from the manual operation to the automatic operation, there is known switching based on such iris (diaphragm) adjustment as shown in FIG. 6. In the switching (switching performed at a time indicated by the arrow in FIG. 6), a present value (command or detected value; F5.6) of an iris for the manual operation is set as a command to be used for the automatic operation. This allows a shift to be made to the automatic operation from an adjustment value used for the manual operation.

In the above-mentioned iris adjustment, when the selection (switching) for setting the camera apparatus as the operation device is performed by the lens apparatus at a time different from the time of communication between the camera apparatus and the lens apparatus, the present value of the iris cannot be set as the command to be used for the automatic operation at the time of the selection.

For that reason, the lens apparatus may drive the iris based on the command (past value) for the automatic operation, which is stored in the lens apparatus, and is different from the present value of the iris. That is, the lens apparatus may drive the iris based on the command (F2.8) used in the automatic operation performed in a past period as shown in FIG. 7. Therefore, at the time of the subsequent communication, the iris may be driven so as to have a value (state) different from the present value exhibited at the time of the selection of the automatic operation (camera apparatus).

In this manner, when the switching from the manual operation to the automatic operation (selection of the operation device) is performed, the iris cannot be seamlessly adjusted (controlled) from the present value of the iris exhibited at the time of the switching (selection). The same issue is not only caused in the iris but may be caused in another movable optical member (optical element).

SUMMARY OF THE INVENTION

The disclosure provides, for example, a lens apparatus advantageous in selecting an operation device for operating a state of an optical member therein.

According to one embodiment in the disclosure, there is provided a lens apparatus including: an optical member; an input device configured to perform input for selecting an operation device for operating a state of the optical member; and a controller configured to perform, in a case where a command is input from the selected operation device, a first control of the state of the optical member based on the input command; and perform, in a case where a command is not input from the selected operation device, a second control of the state of the optical member based on a state of the optical member at a time when the input for selecting the operation device is performed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
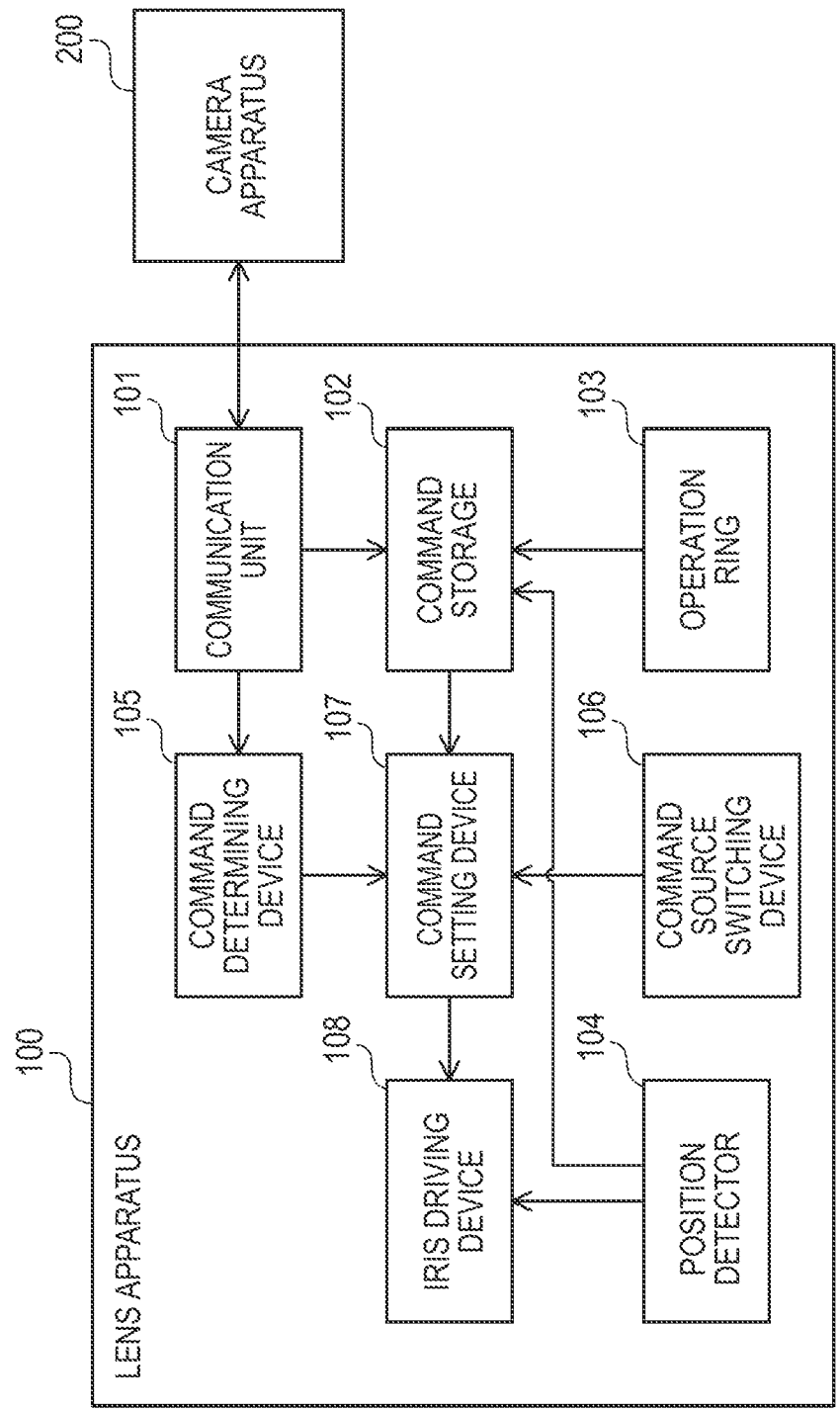
FIG. 1 is a block diagram of a lens apparatus according to a first embodiment of the present invention.

Now, exemplary embodiments of the present invention are described in detail with reference to the accompanying drawings. FIG. 1 is a configuration block diagram relating to one embodiment of the present invention.

First Embodiment

Figure 2:
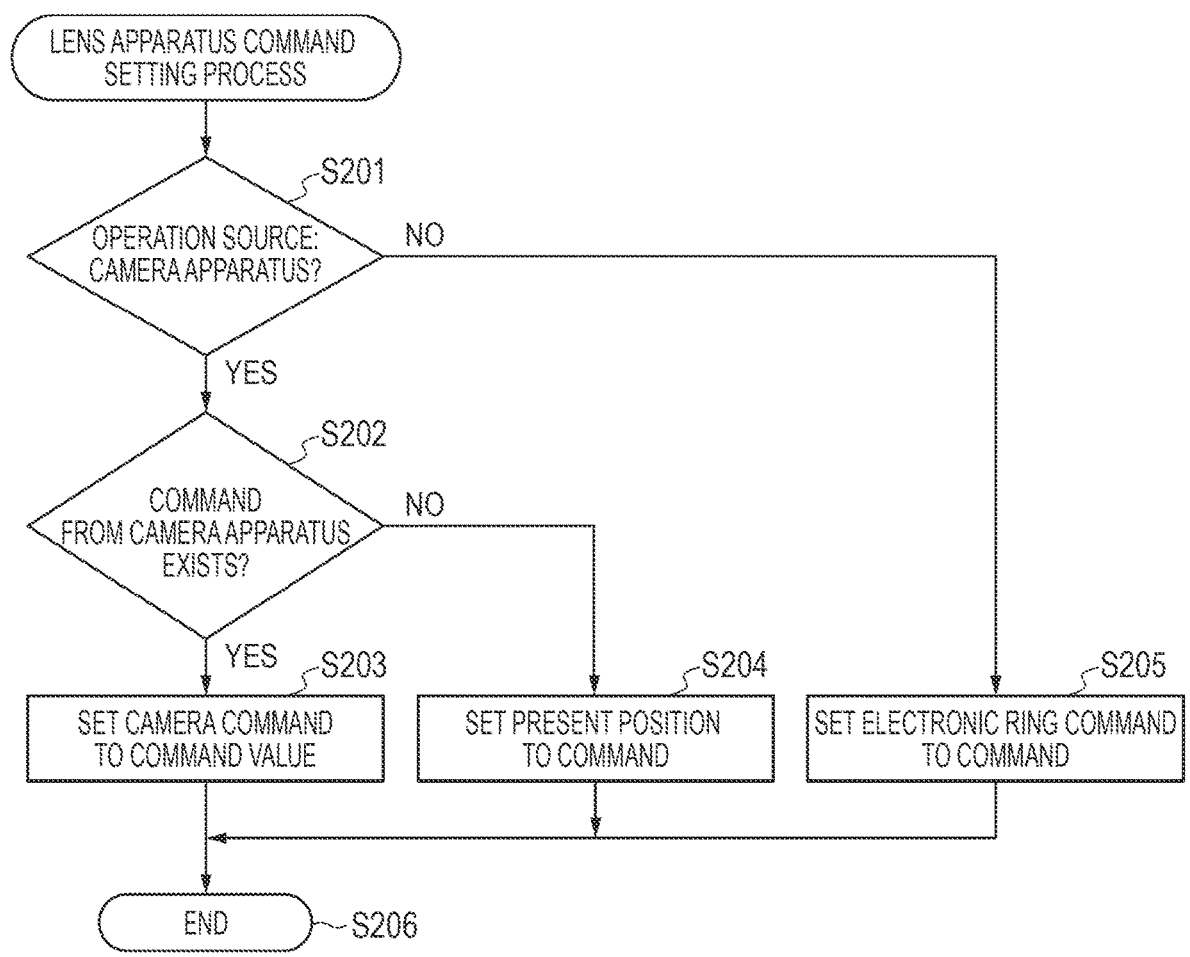
FIG. 2 is a flow chart for illustrating a process performed until a command for the lens apparatus according to the first embodiment is determined.
Figure 3:
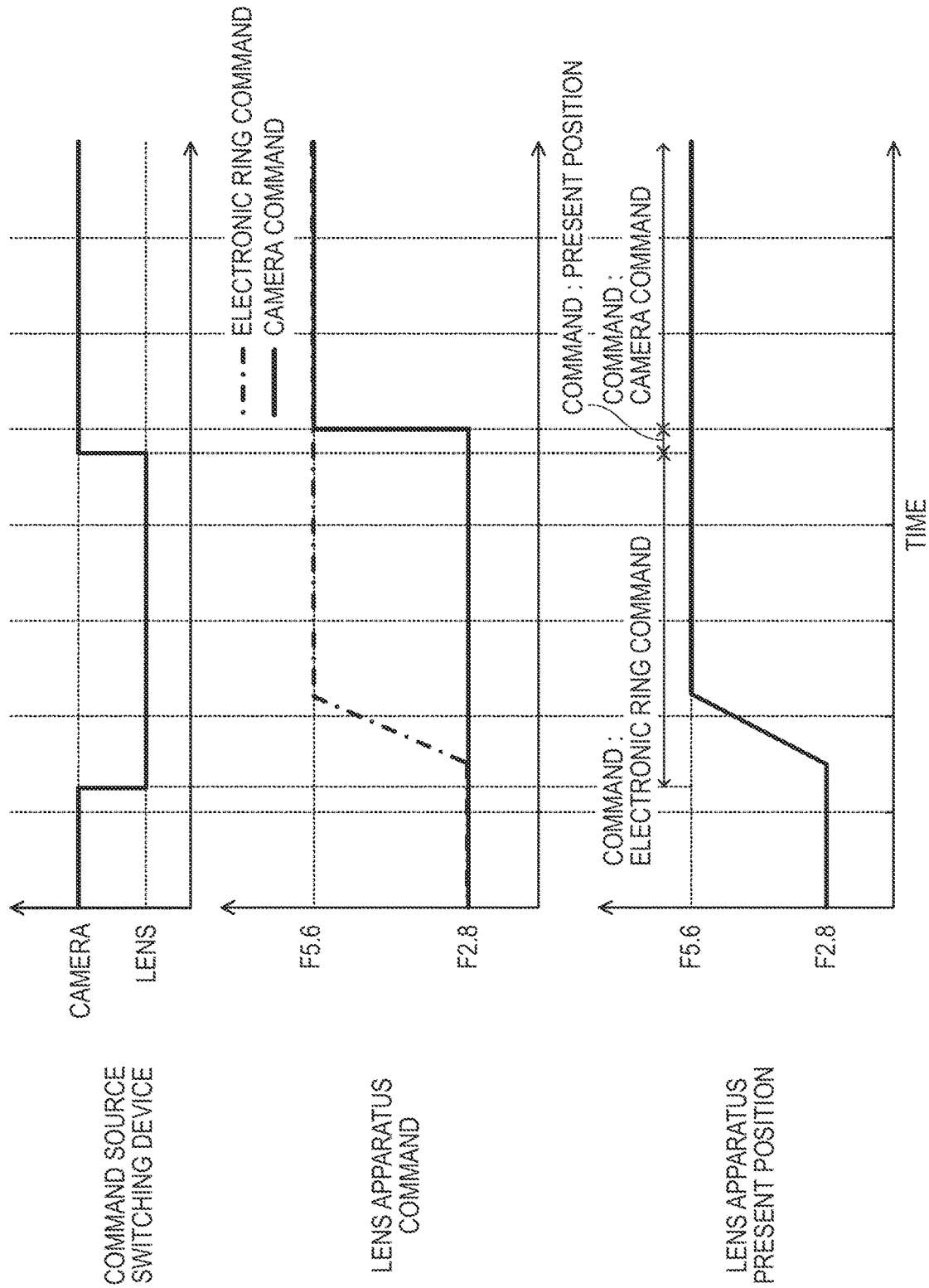
FIG. 3 is a graph for showing a relationship between the command and a present position for the lens apparatus according to the first embodiment, which is exhibited when a command source is switched.

With reference to FIG. 1 to FIG. 3, a lens apparatus according to a first embodiment of the present invention is described below. FIG. 1 is a block diagram of the lens apparatus according to the first embodiment of the present invention. In FIG. 1, a lens apparatus 100 and a camera apparatus 200 are illustrated.

The lens apparatus 100 is described.

The lens apparatus 100 includes a communication unit (or a communication device) 101, a command storage 102, an operation ring (manual operation member) 103, a position detector 104, a command determining device (controller) 105, a command source switching device (input device) 106, a command setting device (controller) 107, and an iris driving device 108.

The communication unit 101 communicates to/from the outside (apparatus other than the lens apparatus; camera apparatus in the first embodiment). The communication unit 101 is also connected to the command storage 102, and outputs a command for driving an iris, which is acquired from the outside, to the command storage 102. The communication unit 101 is further connected to the command determining device 105, and publishes the command thereto when the command is acquired from the outside.

The command storage 102 acquires the command for driving the iris from the outside via the communication unit 101 to hold the acquired command as the command from the outside. The command storage 102 is also connected to the operation ring 103, and acquires the command for driving the iris from the operation ring 103 to hold the acquired command as the command of the operation ring 103. The command storage 102 further acquires a present position of the iris via the position detector 104 to hold the present position. The command storage 102 is also connected to the command setting device 107, and publishes the command from the outside, the command of the operation ring 103, and the present position of the iris to the command setting device 107.

The operation ring 103 generates a command for driving the iris corresponding to a position of the operation ring, and outputs the command to the command storage 102.

The position detector 104 is connected to the iris driving device 108, and acquires the present position of the iris. The position detector 104 is also connected to the command storage 102, and outputs the present position of the iris to the command storage 102.

The command determining device 105 is connected to the communication unit 101, and determines whether or not the communication unit 101 has acquired the command for driving the iris from the outside. The command determining device 105 also outputs command information being a result of the determination to the command setting device 107.

The command source switching device 106 switches a command source for driving the iris between an external apparatus for enabling the command from the outside and the lens apparatus for enabling the command of the operation ring 103, to thereby generate command source information. The command source switching device 106 is also connected to the command setting device 107, and outputs the command source information to the command setting device 107.

The command setting device 107 is connected to the command determining device 105 and the command source switching device 106, and acquires the command information from the command determining device 105 and the command source information from the command source switching device 106. The command setting device 107 is also connected to the command storage 102, and sets the command from the outside, the command of the operation ring 103, or the present position of the iris as the command for driving the iris based on the command information and the command source information. The command setting device 107 outputs the set command to the iris driving device 108.

The iris driving device 108 drives the iris based on the command input from the command setting device 107. The iris driving device 108 is also connected to the position detector 104, and publishes the present position of the iris to the position detector 104.

A method of determining the command based on the command information and the command source information by the command setting device 107 is described later in detail.

With the above-mentioned configuration, the command for driving the iris can be switched by the command setting device 107 based on the command information input from the command determining device 105 and the command source information input from the command source switching device 106. It is also possible to drive the iris through use of the command determined by the command setting device 107.

The camera apparatus 200 is attachably and removably connected to the lens apparatus 100, and includes an image pickup element (not shown) configured to receive an optical image formed by the lens apparatus 100. The camera apparatus 200 can also output a command relating to the driving of a movable optical member inside the lens apparatus 100 to the lens apparatus. An image pickup apparatus is configured by connecting the lens apparatus 100 and the camera apparatus 200 to each other. By setting the camera apparatus 200 as the above-mentioned external apparatus and connecting the camera apparatus 200 to the lens apparatus 100, it is possible to perform the following process.

Now, with reference to a flow chart of FIG. 2, a lens apparatus command setting process for setting the command for the iris by the command setting device 107 in the first embodiment is described. This process is performed in accordance with a computer program stored in the lens apparatus 100.

In Step S201, the command setting device 107 acquires the command source information from the command source switching device 106, and determines which of the lens apparatus 100 serving as a command source of an operation ring command for performing a manual operation and the camera apparatus 200 serving as a command source of a camera command for performing an automatic operation is selected as the command source information. The command setting device 107 advances to Step S202 when the camera apparatus 200 is selected as the command source information, and advances to Step S205 when the camera apparatus 200 is not selected.

In Step S202, the command setting device 107 acquires, from the command determining device 105, the command information indicating whether or not the camera command for enabling the automatic operation of the iris has been acquired from the camera apparatus 200 by the lens apparatus 100 after the command source information is switched to the camera apparatus (indicating the presence or absence of the command from the command source). The command setting device 107 advances to Step S203 when the command information indicates the presence of the command, and advances to Step S204 when the command information indicates the absence of the command.

In Step S203, in order to drive the iris by the automatic operation, the command setting device 107 sets the command to be output to the iris driving device 108 to the camera command acquired from the camera apparatus 200, which is held by the command storage 102, and brings the process to an end (first control).

In Step S204, in order to maintain the present position of the iris, the command setting device 107 sets the command to be output to the iris driving device 108 to the present position of the iris, which is held by the command storage 102, and brings the process to an end (second control).

In Step S205, in order to drive the iris by the manual operation, the command setting device 107 sets the command to be output to the iris driving device 108 to the command of the operation ring 103, which is held by the command storage 102, and brings the process to an end.

By performing the process in the above-mentioned manner, it is possible to set a command corresponding to the state of the lens apparatus based on the command source information acquired in the lens apparatus 100 and the command from the camera apparatus 200.

Figure 7:
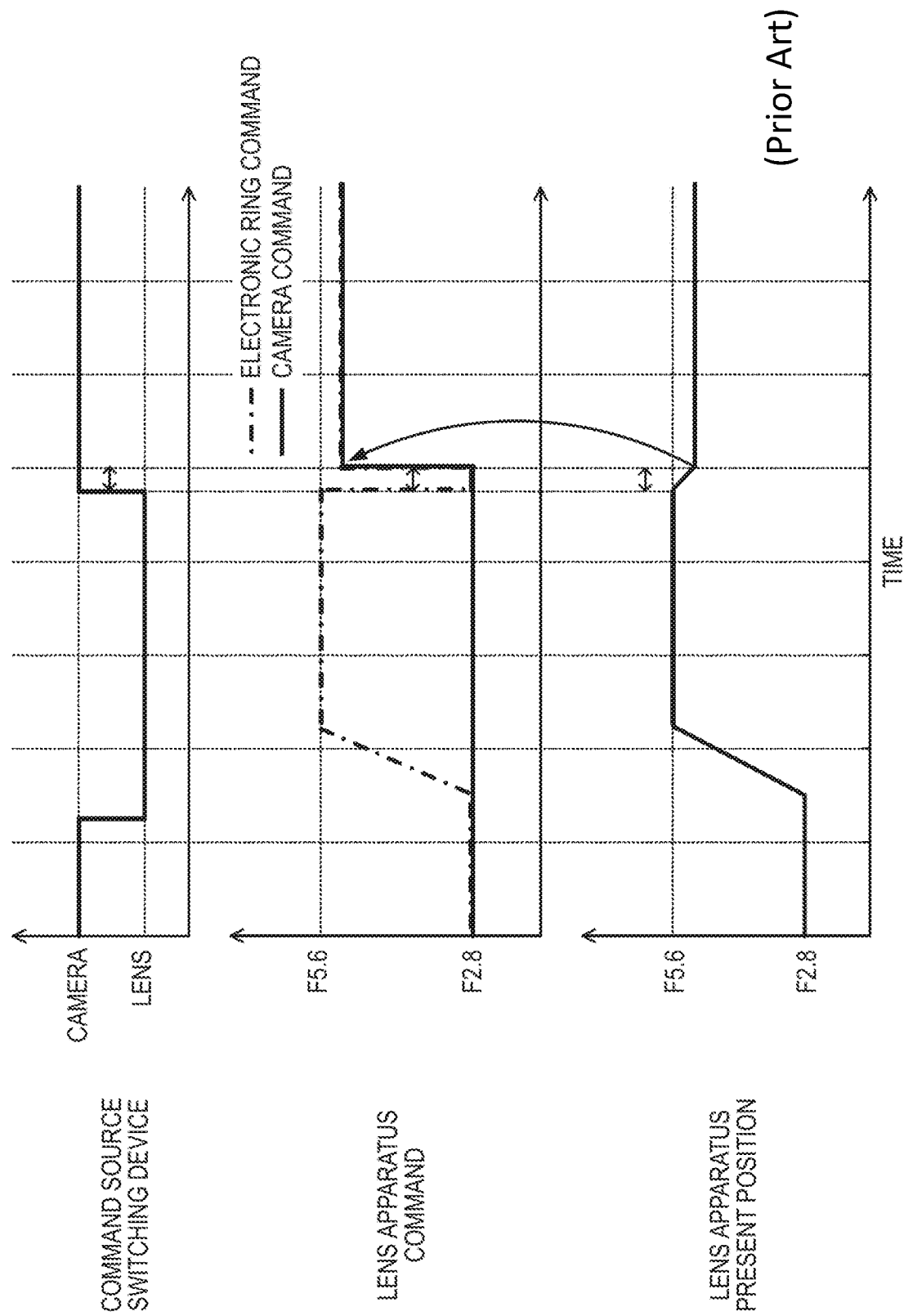
FIG. 7 is a graph for showing a relationship between the command and the present position for the lens apparatus, which is exhibited when the command source is switched, in consideration of a communication cycle period between the lens apparatus and a camera apparatus.

Therefore, as shown in FIG. 3, even when the command source switching device is switched to the camera apparatus 200 at a timing other than a communication cycle period between the lens apparatus 100 and the camera apparatus 200, not the camera command but the present position of the iris is set as the command to be output to the iris driving device 108. This prevents the iris from being driven based on such a camera command set in a past period as shown in FIG. 7, and the present position is maintained. Thus, even during the subsequent communication cycle period, the same position of the iris as when the switching is performed can be set for the lens apparatus 100 as the camera command for causing the camera apparatus 200 to perform the automatic operation.

Accordingly, iris control can be seamlessly switched even when the user adjusts the iris by the manual operation and switches the iris control to the automatic operation with reference to the adjusted position.

As described above, when the command source is switched from the lens apparatus to the camera apparatus in order to switch from the manual operation to the automatic operation through use of the related art, the command is not updated until a timing for the subsequent update cycle period, and an unintended command is set, which leads to a problem that seamless switching cannot be performed.

In the first embodiment, in a case where the command of the command source has not been updated when the command source for the iris is switched from the lens apparatus to the camera apparatus, the present position of the iris is maintained (the iris is controlled based on the state of the iris exhibited at a time point when input for selection is performed), to thereby achieve the seamless switching of the iris control.

According to the first embodiment, it is possible to provide a lens apparatus capable of switching the command of the iris control based on the command source information for selecting the command source of the iris control and the command from the camera apparatus, to thereby allow the switching to be performed seamlessly from the manual operation to the automatic operation.

The first embodiment has been described above by employing the iris as an optical member, but the optical member is not required to be an iris. Any optical member that can perform position control can produce the same effects.

The first embodiment has also been described by employing the camera apparatus as an external apparatus, but the external device is not required to be a camera. Any external apparatus that can communicate to/from the lens apparatus and generate the command may be employed.

The first embodiment has also been described by employing the operation ring for a manual operation, but the operation ring is not required to be employed for a manual operation. Any operation member for the lens apparatus that can generate a manual command may be employed.

The first embodiment has also been described on the assumption that digital communication is involved, but analog communication may be involved instead.

Second Embodiment

Figure 4:
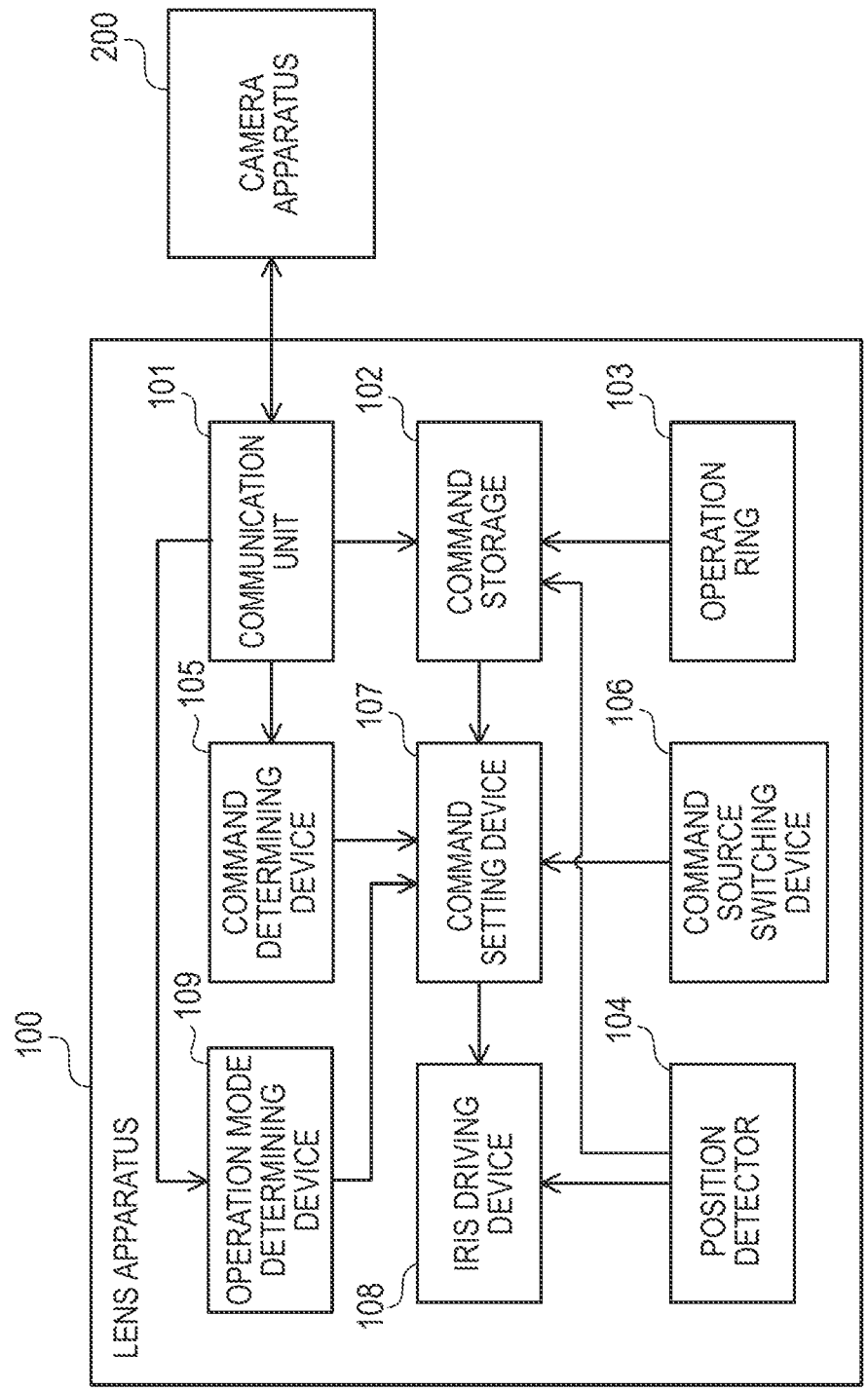
FIG. 4 is a block diagram of a lens apparatus according to a second embodiment of the present invention.
Figure 5:
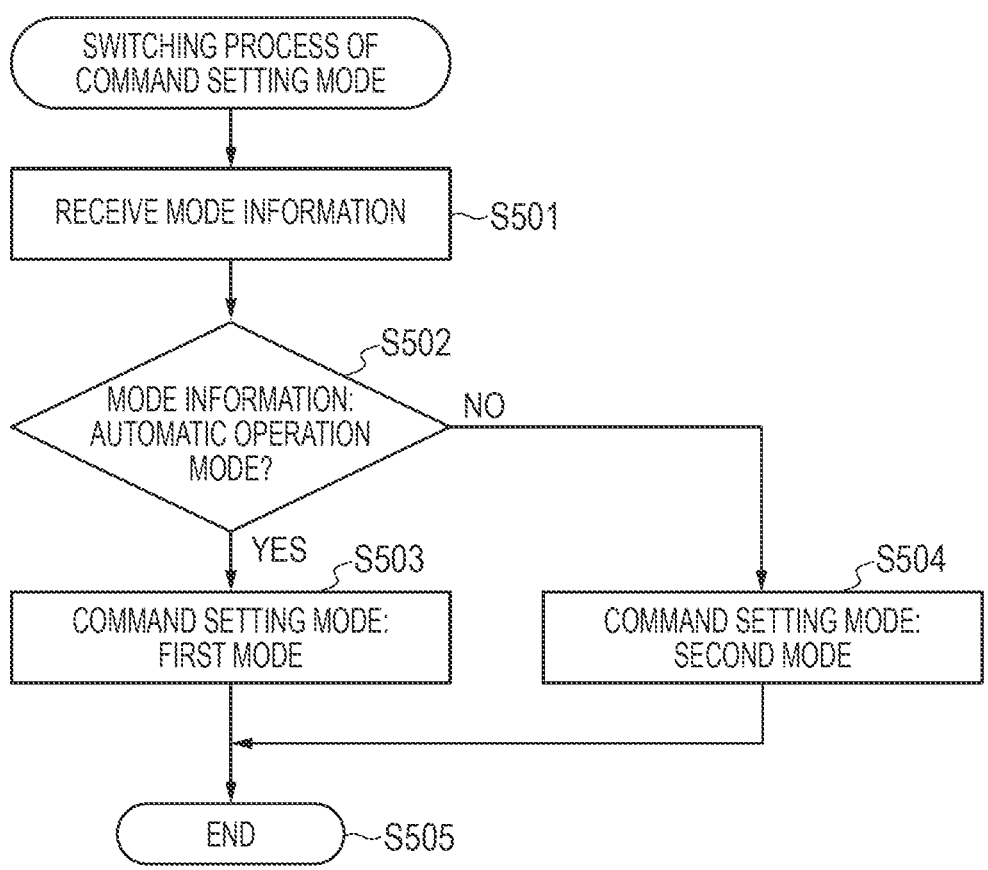
FIG. 5 is a flow chart for illustrating a process performed until a command setting mode of the lens apparatus according to the second embodiment is determined.
Figure 6:
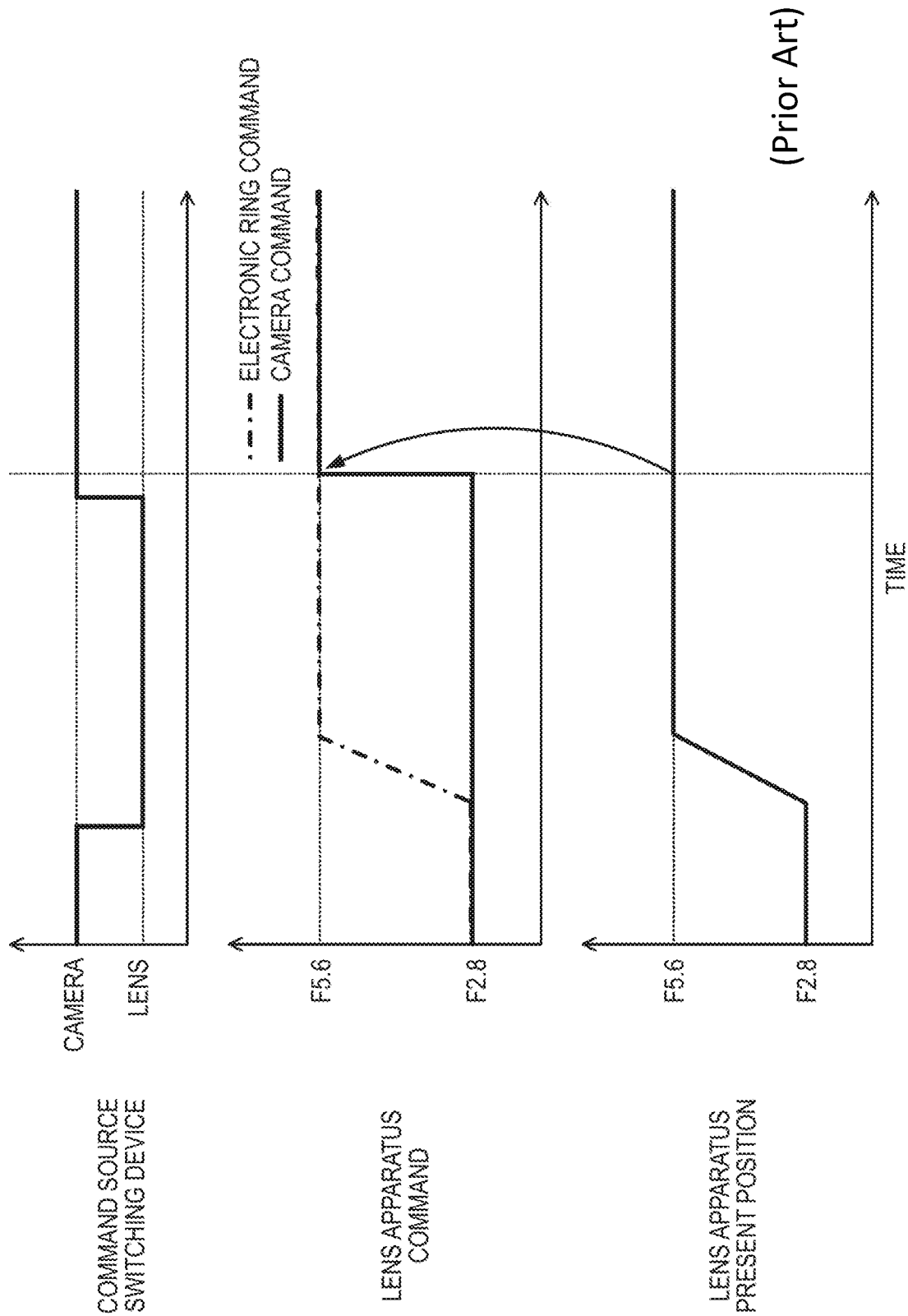
FIG. 6 is a graph for showing an ideal relationship between the command and the present position for the lens apparatus, which is exhibited when the command source is switched.

Now, with reference to FIG. 4 and FIG. 5, an image pickup apparatus according to a second embodiment of the present invention is described. The same components as those of the first embodiment are denoted by the same reference symbols, and descriptions thereof are omitted.

FIG. 4 is a block diagram of the image pickup apparatus according to the second embodiment. FIG. 4 is different from FIG. 1 referred to in the first embodiment in that an operation mode determining device (mode determination unit) 109 is added.

The communication unit 101 is connected to the external apparatus (apparatus other than the lens apparatus; camera apparatus in the second embodiment), and acquires mode information on the iris control from the external apparatus. In other words, the external apparatus herein refers to an external apparatus having a function of outputting not only the command for the iris control but also the mode information indicating a control mode used to output a command for driving the iris. The communication unit 101 is also connected to the operation mode determining device 109, and publishes the mode information acquired from the outside to the operation mode determining device 109.

The operation mode determining device 109 acquires the mode information on the control to be performed from the outside via the communication unit 101. The operation mode determining device 109 also determines, as a command setting mode, a first mode of enabling the setting process in the first embodiment for using the present position of the iris as the command until the command is newly reset or a second mode of enabling the setting process in the related-art technology for using the command set in a past period until the command is newly reset. The operation mode determining device 109 is also connected to the command setting device 107, and outputs the mode switching information based on the result of the determination to the command setting device 107.

The command setting device 107 is connected to the operation mode determining device 109, and acquires the mode switching information from the operation mode determining device 109. The command setting mode for driving the iris is switched based on the acquired mode switching information. When the command setting mode is the first mode, the command is set based on the command information and the command source information. The command setting device 107 outputs the set command to the iris driving device 108.

A method of switching the command setting mode based on the mode switching information is described later in detail.

With the above-mentioned configuration, it is possible to set the command for driving the iris based on an operation mode acquired from the outside by automatically switching the command setting mode of the lens apparatus based on the mode information input from the outside. It is also possible to drive the iris through use of the command determined by the command setting device 107.

By setting the camera apparatus 200 as the above-mentioned external apparatus and connecting the camera apparatus 200 to the lens apparatus 100, it is possible to perform the following process.

Now, with reference to a flow chart of FIG. 5, a process for switching the command setting mode by the operation mode determining device 109 in the second embodiment is described. This process is periodically performed in accordance with a computer program stored in the lens apparatus 100.

In Step S501, the operation mode determining device 109 acquires the mode information on the control to be performed by the camera apparatus 200 from the camera apparatus 200 via the communication unit 101, and advances to Step S502.

In Step S502, the operation mode determining device 109 determines whether or not the mode information indicates an automatic operation mode of enabling an operation in the first embodiment for using the present position of the iris as the command until the command is newly reset. When the result of the determination is the automatic operation mode, the operation mode determining device 109 sets the mode switching information to the first mode, and advances to Step S503. Meanwhile, when the result of the determination is not the automatic operation mode, the operation mode determining device 109 sets the mode switching information to the second mode, and advances to Step S504.

In Step S503, the operation mode determining device 109 sets the command setting mode to be used by the command setting device 107 to the first mode of enabling the command setting process in the first embodiment for using the present position of the iris as the command until the command is newly reset, and brings the process to an end (second control).

In Step S504, the operation mode determining device 109 sets the command setting mode to be used by the command setting device 107 to the second mode of enabling the command setting process in the related-art technology for using the command set (stored) in a past period until the command is newly reset, and brings the process to an end (third control).

By performing the process in the above-mentioned manner, it is possible to set an appropriate command by switching the command setting mode based on the operation mode of the camera apparatus 200 not only for the camera apparatus 200 capable of performing the automatic operation but also for the camera apparatus 200 capable of performing a remote operation that allows an absolute value to be set from the camera apparatus 200. Therefore, it is possible to set a command corresponding to the states of the camera apparatus 200 and the lens apparatus 100.

Therefore, when the camera apparatus 200 is in the state of the automatic operation mode of automatically controlling an optical member, the lens apparatus 100 can enable the command setting process for automatically performing the seamless switching based on the information received from the camera apparatus 200.

Further, when the camera apparatus 200 is in a state in which the past camera command is required to be employed immediately after an operation source is switched as in a remote operation mode, it is possible to automatically enable the command setting process for employing the past camera command. The remote operation mode refers to a state of the camera apparatus 200 exhibited when a remote controller connected to the camera apparatus 200 is used as the operation source, in which, for example, the command involving the camera apparatus 200 is not newly reset until the operation member for manually operating the iris is moved.

As described above, it is possible to achieve the seamless switching of the iris control based on the state of the camera apparatus 200.

According to the second embodiment, it is possible to provide a lens apparatus capable of switching the command based on the operation mode of the camera apparatus, the command source information for selecting the command source of the iris control, and the command from the camera apparatus, to thereby allow the seamless switching of the iris control to be performed.

The second embodiment has been described above on the assumption that the two modes are the automatic operation mode and the remote operation mode, but the two modes are not required to be those modes. The mode information is only required to indicate an operating state for enabling the operation in the first embodiment for using the present position of the iris as the command until the command is newly reset and an operating state in which the past camera command is required to be employed immediately after the operation source is switched.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-204261, filed Oct. 23, 2017, which is hereby incorporated by reference herein in its entirety.

What is claimed is:

1. A lens apparatus comprising:
an optical member;
a manual operation member for operating a state of the optical member;
an input device configured to perform input for selecting an operation device between the manual operation member and an external apparatus, for operating the state of the optical member;
a storage configured to store, in a case where the input for selecting the external apparatus is performed, a command input from the selected external apparatus; and
a controller configured to:
perform, in the case where the input for selecting the external apparatus is performed and a command is input from the selected external apparatus, a first control of the state of the optical member based on the stored command; and
perform, in the case where the input for selecting the external apparatus is performed and a command is not input from the selected external apparatus, a second control of the state of the optical member based on a state of the optical member at a time when the input for selecting the external apparatus is performed.

2. The lens apparatus according to claim 1, wherein the controller is configured to perform the second control of the state of the optical member based on a command corresponding to the state of the optical member at the time.

3. The lens apparatus according to claim 1, wherein the controller is configured to perform, in the case where the input for selecting the external apparatus is performed and a command is not input from the selected external apparatus, the first control instead of the second control, based on information indicating former one of the first control and the second control.

4. The lens apparatus according to claim 1, wherein the external apparatus includes a camera apparatus which performs an automatic operation of the lens apparatus.

5. The lens apparatus according to claim 3, wherein the information indicating the former one includes information indicating a camera apparatus which performs a remote operation of the lens apparatus.

6. The lens apparatus according to claim 1, wherein the external apparatus comprises a camera apparatus.

7. An image pickup apparatus comprising:
a lens apparatus comprising:
an optical member;
a manual operation member for operating a state of the optical member;
an input device configured to perform input for selecting an operation device between the manual operation member and an external apparatus, for operating the state of the optical member;
a storage configured to store, in a case where the input for selecting the external apparatus is performed, a command input from the selected external apparatus; and
a controller configured to:
perform, in the case where the input for selecting the external apparatus is performed and a command is input from the selected external apparatus, a first control of the state of the optical member based on the stored command; and
perform, in the case where the input for selecting the external apparatus is performed and a command is not input from the selected external apparatus, a second control of the state of the optical member based on a state of the optical member at a time when the input for selecting the external apparatus is performed; and
a camera apparatus.

8. A lens apparatus comprising:
an optical member;
a manual operation member for operating a state of the optical member;
a controller configured to receive input for selecting one of the manual operation member and an external apparatus as an operation device for operating the state of the optical member; and
a storage configured to store, in a case where the controller receives an input for selecting the external apparatus, a command input from the selected external apparatus,
wherein the controller is configured to:
perform, in a case where the controller receives the input for selecting the external apparatus and a command is input from the selected external apparatus, a first control of the state of the optical member based on the stored command; and
perform, in a case where the controller receives the input for selecting the external apparatus and a command is not input from the selected external apparatus, a second control of the state of the optical member such that the state of the optical member is kept in a state of the optical member at a time when the controller receives the input for selecting the external apparatus.

9. The lens apparatus according to claim 8, further comprising an input device configured to perform the input to the controller.

10. The lens apparatus according to claim 8, wherein the controller is configured to perform the second control of the state of the optical member based on a command generated via the manual operation member at the time.

11. The lens apparatus according to claim 8, wherein the external apparatus includes a camera apparatus which performs an automatic operation of the state of the optical member.

12. An image pickup apparatus comprising a lens apparatus of claim 8 and a camera apparatus.

* * * * *